United States Patent [19]

Rieger

[11] Patent Number: 4,479,721

[45] Date of Patent: Oct. 30, 1984

[54] AGITATOR FOR GRAPE MASH FERMENTATION TANKS

[76] Inventor: Herbert Rieger, Talstrasse 33, 7121 Ingersheim, Fed. Rep. of Germany

[21] Appl. No.: 321,328

[22] Filed: Nov. 13, 1981

[30] Foreign Application Priority Data

Nov. 18, 1980 [DE] Fed. Rep. of Germany ....... 3043541

[51] Int. Cl.³ ............................................... B01F 7/18
[52] U.S. Cl. ................................... 366/327; 366/329; 366/147; 416/242
[58] Field of Search ............... 366/147, 307, 279, 224, 366/326, 327, 329, 144, 245, 247, 249, 251, 242, 276, 278, 65, 325–331, 241, 244; 99/277, 2; 165/87, 92, 142; 416/242, 237, 199, 200 R

[56] References Cited

U.S. PATENT DOCUMENTS

| | | | |
|---|---|---|---|
| 583,572 | 6/1897 | Gordon et al. | 366/326 |
| 850,525 | 4/1907 | Dazey | 366/147 |
| 1,944,742 | 1/1934 | Keller | 366/326 |
| 3,030,083 | 4/1962 | Stiffler | 416/199 |
| 3,630,636 | 12/1971 | Hill | 416/199 |
| 3,887,169 | 6/1975 | Maynard | 366/307 |
| 4,083,653 | 4/1978 | Stiffler | 366/329 |

FOREIGN PATENT DOCUMENTS

| | | | |
|---|---|---|---|
| 1932044 | 1/1971 | Fed. Rep. of Germany | |
| 1507894 | 3/1971 | Fed. Rep. of Germany | 366/224 |
| 2702795 | 7/1978 | Fed. Rep. of Germany | 366/326 |

Primary Examiner—Stephen Marcus
Assistant Examiner—Brian J. Bowman
Attorney, Agent, or Firm—Burmeister, York, Palmatier, Hamby & Jones

[57] ABSTRACT

An agitator for grape mash comprising a rotary shaft and blade-shaped stirring wings having at least one first section inclined at an angle relative to the sense of rotation is characterized in that the said first section (19, 23) ends—viewed in at least one sense of rotation—in a second wing section (20, 21, 25, 26, 50, 51) inclined in the same direction but at an angle smaller than the angle of inclination of the said first section.

6 Claims, 7 Drawing Figures

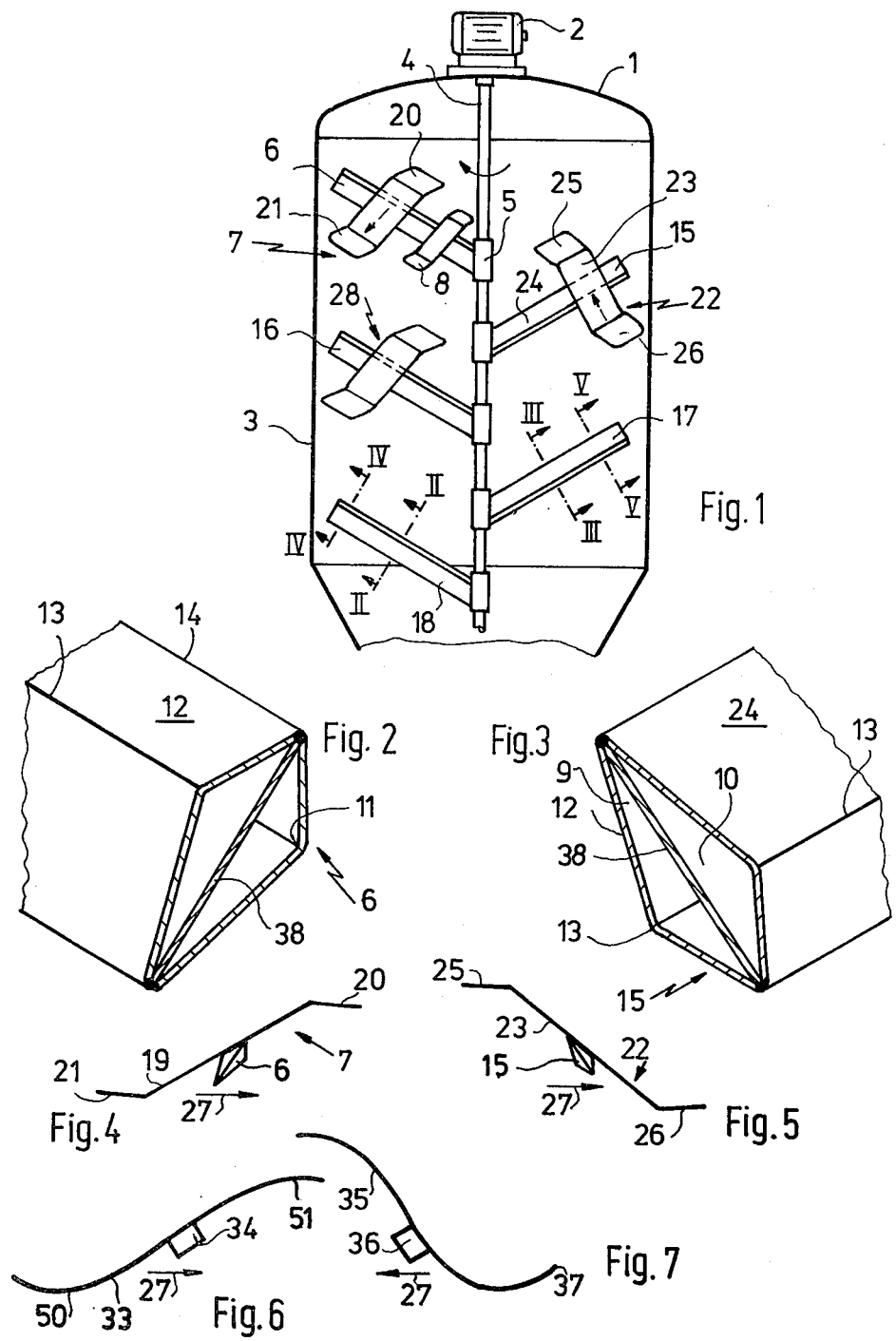

AGITATOR FOR GRAPE MASH FERMENTATION TANKS

FIELD OF THE INVENTION

The present invention relates to an agitator for a grape mash fermentation tank comprising a rotary shaft provided with blade-shaped stirring wings having at least one portion inclined at a certain angle relative to the direction of rotation.

BACKGROUND OF THE INVENTION

In the agitators of this type known from German Disclosed Patent Application 26 43 560, a first portion of the stirring wing which acts in the one sense of rotation to direct the material in the tank upwardly is followed, viewed in the radial direction, by a second stirring wing portion which directs the material in the container downwardly. These sections are inclined at a relatively big angle relative to the sense of rotation. However, these known stirring wings are not suited for use in grape mash fermentation tanks as these known stirring wings do not achieve a satisfactory degree of mixing of the grape mash as these stirring wings will in most of the cases entrain the mash in a circular movement. To overcome this last-mentioned drawback, one generally provides the inner wall of the container with rigid hold-ups which project right into the area of the mixing wings. But in most of the cases, these hold-ups obstruct the thorough vertical mixing of the grape mash which in fact is composed of rape, yeast, juice and grapeseeds, i.e. substances of very different densities. Very unsatisfactory results are obtained with these known agitators in particular when mixing grape mash after the beginning or completion of the process of fermentation.

On the other hand, if the angle of inclination of the stirring wings known from German Disclosed Patent Application No. 26 43 560 is selected relatively small, the tendency of the agitator wing to entrain the grape mash in a rotary movement is indeed reduced, but vertical lifting of the material to be mixed is unsatisfactory so that only a very low and unsatisfactory degree of mixing of the grape mash in the vertical direction is achieved. Still, one cannot at desire increase the dimensions of slightly inclined mixing wings in the direction of rotation so as to achieve sufficient lifting of the material to be mixed, because such an increase of the surface of the mixing wings would in turn increase a tendency for the material to be mixed to be entrained in a rotary movement rather than to be lifted.

To achieve vertical mixing of the grape mash, Patent Application No. P 30 12 829 proposes to provide a helically wound sheet steel strip at a certain distance around the vertical shaft, which strip is held at the vertical rotating shaft by means of bars to rotate together with the shaft and convey the material in the one sense of rotation upwardly—if the material does not rotate together with the relatively wide sheet steel strip. Immediately adjacent to the circumference of the shaft, there is provided a second sheet steel strip of inverse helical shape so that in the one sense of rotation the material in the tank is pressed upwardly by the outer helical strip and downwardly by the inner helical strip. This design is extremely complicated and expensive, the sheet steel strips are difficult to clean and have a tendency, due to their large surface, to entrain the grape mash in their circular movement. Moreover, the degree of mixing of the grape mash is considerably inferior to what one could expect, in particular when red grape mash is to be mixed.

But it is just the mixing of red grape mash during fermentation that creates special problems. In tanks without agitators, the rapes tend to concentrate on the surface and to form a very solid grape-cake. But if red wine is to get a deep colour, the rapes must remain in intimate contact with the juice during fermentation. On the other hand, however, it is necessary that mixing be carried out with utmost care.

SUMMARY OF THE INVENTION

Now, it is the object of the present invention to provide an agitator for a tank for mixing grape mash, especially red grape mash or drained white grape mash, in a manner to ensure that red wine will get the desired deep colour and white wine, too, can be optimally treated, while meeting at the same time the demands for cleaning ease and simple design.

According to the invention, this problem is solved in that a first stirring wing section is followed, in at least one sense of rotation, by a second stirring wing section inclined in the same direction, but at an angle smaller than the angle of inclination of the first section.

While in the arrangement known from German Disclosed Patent Application No. 26 43 560 the stirring wing extending from the vertical rotary shaft is composed of sections of different angles of inclination following each other in the radial direction, the agitator of the invention comprises stirring wing sections of different angles of inclination, but equal direction of inclination, following each other in the sense of rotation of the stirring wing.

Tests have shown that the agitators of the invention give excellent mixing results in the treatment of grape mash; in particular, these agitators are suited for treating fermenting mash, i.e. for use in grape mash fermentation tanks. This result is attributed to the fact that the leading stirring wing section—viewed in the sense of rotation—makes a cut through the material in the tank. Now, when the agitator is used in an upright tank with vertical agitator shaft and when the stirring wing is to transport the material upwardly, the leading stirring wing section which is inclined at the smaller angle separates the partial volume of grape mash in front of the wing from the lower partial volume, and as a result thereof the mash portion present in front of the wing will easily slide upwardly along the surface of the stirring wing section exhibiting the greater angle of inclination. The angle of inclination of the trailing stirring wing section—viewed in the sense of rotation—may be relatively large, for instance 45°. As the mash portion in front of the stirring wing is separated from the lower mash quantity by the leading wing section, it will easily slide upwardly, even if the trailing wing section is inclined at steeper angles, and will not tend to be entrained by the wing in a circular movement.

This agitator also provides a satisfactory solution for the pigment extraction problem in the case of red grape mash, as the agitator, which mainly acts to lift and lower individual portions of the grape-cake, produces a very gentle mixing movement.

However, application of the invention is not restricted to upright tanks with vertical stirring wing shaft; rather, the invention may also be applied to agitators with horizontal stirring wing shaft in horizontal tanks. Here, too, very good mixing results are obtained.

Further, the invention may be applied not only to agitators which have the stirring wings directly mounted on the shaft, but also to agitators which have the stirring wings mounted on rods extending from the rotary shaft. In this latter case, certain embodiments of the invention may have the stirring wing section with the greater angle of inclination fixed to the rod.

In certain embodiments of the invention, the first stirring wing section with the larger angle of inclination may have only one second leading stirring wing section with a smaller angle of inclination, while in other embodiments of the invention, stirring wing sections with smaller angles of inclination may extend in both senses of rotation from the stirring wing section with the larger angle of inclination. This latter arrangement offers the advantage that the mash portion found in front of the stirring wing—viewed in the sense of rotation—will after having been transported upwardly or downwardly in the direction of the shaft by the stirring wing section with the greater angle of inclination calm down again in the area of the stirring wing section with the smaller angle of inclination. Moreover, this arrangement is advantageous in the case of agitators which may be driven in both senses of rotation.

In certain embodiments of the invention, the connection between the stirring wing section with the greater angle of inclination and that with the smaller angle of inclination takes the form of an edge, while in certain other embodiments of the invention, this transition portion may be curved. In still other embodiments of the invention, the whole wing may be shaped in the form of an S.

In certain embodiments of the invention, the stirring wing section with the smaller angle of inclination forms an angle of between 0° and 15° with the plane of rotation, while the stirring wing section with the greater angle of inclination may extend at an angle of between 15° and 45° relative to the section with the smaller angle of inclination.

In the embodiment of the invention in which the stirring wings are mounted on rods extending radially from the agitator shaft the stirring wings may also be arranged to move the material to be mixed in the radial direction. In agitators with vertical shaft, for instance, such a horizontal movement of the material in the tank may be desired to favour de-mixing of the material in the tank, i.e. settlement of the heavier components.

The stirring wings act to cut any grape-cake existing on the surface gently and completely and to mix the mash thoroughly, so that the resulting mixture is well suited for pumping. Uniform mixing is achieved irrespective of the quantity of material in the tank.

Particularly favourable effects can be achieved with certain embodiments of the invention which have one group of stirring wings inclined in one sense of rotation and another group of stirring wings inclined in the other, i.e. the opposite, sense of rotation. In this case, the stirring wings of both groups may be arranged behind each other, viewed in the sense of rotation, or else—as for instance in the embodiment of the invention in which the stirring wings are mounted on rods—radially adjacent each other. If an agitator with vertical shaft has the stirring wings of the two groups arranged behind each other viewed in the sense of rotation, and if the stirring wings or the rods carrying them are mounted on the shaft in the same plane, but set off against each other for instance by 180°, the material to be mixed is moved by the one stirring wing in the one direction, and by the other stirring wing in the opposite direction. This "shaking movement" caused by the alternate movement in the two directions mixes the material in the tank very thoroughly, though gently; very good results were obtained especially with red grape mash and drained white grape mash.

In other embodiments of the invention, the arrangement of the stirring wings of the two groups is such that the movement obtained is not so much a "shaking movement"; rather, the material present in an outer annular area around the agitator shaft will be moved in the one direction, while the material present in an inner annular area around the agitator shaft will be moved in the opposite direction.

Finally, there are certain other convenient embodiments of the invention in which the volumes passed by successive stirring wings overlap each other, for instance by one half.

In the embodiments of the invention, the stirring wings may be provided in an arrangement staggered in one angular position and/or in the sense of rotation of the shaft.

Further improvements of embodiments of the invention may, for instance in the case of a vertical arrangement of the agitator shaft, provide for a relatively large distance between two oppositely rotating stirring wings arranged one above the other so that the upper stirring wing will not obstruct the material transportation by the lower stirring wing. In certain other embodiments of the invention, the stirring wings arranged one above the other all move the material in the tank in the same direction. In this case, the distance between the superimposed stirring wings may be kept small because the movement of the upper stirring wing does not obstruct, but rather support the transportation of the material by the lower stirring wing.

In certain embodiments of the invention, the stirring wings may be mounted to rods for rotation, and adjustment, about an axis extending vertically to the rod axis. In certain embodiments of the invention, the mounting of the stirring wings to the rods may be such that the wings can be adjusted either only in the above-described direction or else in the above-described direction and additionally around an axis extending parallel to the rod axis. In this latter embodiment of the invention, the stirring wing may be mounted to the rod by means of a lockable ball-and-socket joint. These embodiments of the invention also help to obtain the adjustment of the stirring wings particularly suited for the nature and consistency of the material in the tank and the intended purpose of the treatment.

In certain embodiments of the invention, the stirring wings mounted directly to the shaft, or the rods carrying the stirring wings, may be mounted to the agitator shaft in a manner to ensure that their axes do not extend at right angles, but at a certain inclination relative to the agitator shaft. In this case, any residues that may remain on the upper surfaces of the rods and stirring wings after draining of the tank can be easily rinsed off. In certain embodiments of the invention, adjusting and locking means may be provided for the angle formed between the rods or the stirring wings and the axis of the agitator shaft.

The cross-section of the rods carrying the stirring wings may be circular, but may also have one flat face serving as support for a plane section of the stirring wing. In one embodiment of the invention the cross-sectional shape of the rod is, therefore, substantially triangular, and the stirring wings are mounted on the upwardly inclined surfaces. But the cross-section of the rod may also take the form of a triangle placed on its apex, or of a rhombus with sides of different length and two opposite angles of equal value.

In a further improvement of this embodiment of the invention, the rods are of hollow cross-section. This makes it possible to incorporate the rods into the heating or cooling system. Preferably, this embodiment of the invention has the hollow cross-section of the rod divided by a partition wall into two channels which are traversed in different directions by a heating or cooling agent.

The tendency of the material to be mixed to rotate with the agitator decreases from the tank wall towards the center of the tank, depending on the consistency of the material. Accordingly, the most convenient distance between the stirring wings and the tank wall will in each instance depend on the material to be mixed. In certain embodiments of the invention, the smallest distance between a stirring wing and the inner face of the tank wall, i.e. the radial distance of the ends of a straight stirring wing, is approximately equal to 1/20 of the tank diameter, while the largest distance between the stirring wing and the tank wall, i.e. in the middle between the two ends, is approximately equal to 1/10 of the tank diameter. But these dimensional relationships may vary within a relatively broad range.

Further features and advantages of the invention will be apparent from the following description of certain embodiments of the invention, read in connection with the claims and the drawings. It is understood that the individual features may be realized in an embodiment of the invention either alone or in any desired combination.

BRIEF DESCRIPTION OF THE DRAWINGS

The drawings show certain embodiments of the invention, and in particular

FIG. 1 a cross-section through one embodiment of a tank according to the invention, with the stirring wings left away at the lower two rods for improved clarity;

FIG. 2 a sectional view along line II—II in FIG. 1, in enlarged scale;

FIG. 3 a sectional view along line III—III in FIG. 1, also in enlarged scale;

FIG. 4 a section along line IV—IV in FIG. 1, in enlarged scale, with a stirring wing mounted on the rod;

FIG. 5 a section along line V—V in FIG. 1, in enlarged scale, with a stirring wing mounted on the rod;

FIGS. 6 and 7 other embodiments of stirring wings.

DETAILED DESCRIPTION OF ILLUSTRATIVE EMBODIMENTS

The embodiment of the invention shown in the drawing has an electric gear motor 2 mounted on the cover 1 of a fermentation tank. The gear motor 2 drives a shaft 4 which is centrally arranged in the fermentation tank and rotatably seated in bearings not shown in the drawing. The shaft 4 carries via sleeves 5 rods 6, 15, 16, 17 and 18 projecting from the shaft outwardly and upwardly in one radial plane containing also the axis of the shaft 4. The rods carry stirring wings 7 and 8. For clarity's sake, FIG. 1 shows two stirring wings 7 and 8 provided in spaced arrangement on rod 6 only.

The stirring wing 7 mounted on the outer end of the rod 6 is bigger than the stirring wing 8 mounted near the inner end, but the dimensional relationships of the stirring wing 8 are the same as those of the stirring wing 7. It would be possible also to provide the larger stirring wing near the inner end of the rod.

The rods 6, 15, 16, 17, and 18 have a hollow cross-section more clearly shown in FIGS. 2 and 3. The hollow cross-section takes the form of a rhombus with sides of different length. The two obtuse angles are substantially equal, while the two acute angles have different values. The lateral faces forming between them the smaller of the two acute angles of the cross-section of the rhombus are greater than the lateral faces forming between them the greater of the two acute angles of the cross-section of the rhombus. The hollow cross-section is sub-divided by means of a partition wall 38 so as to form two channels 9 and 10 communicating at the free end of the rod and serving as passage for a heating or cooling agent. The shaft 4 also comprises two channels not shown in the drawing which also serve as passage for the heating or cooling agent and which communicate with the channels 9 and 10 of the rods 6.

The rods 6 are made from stainless-steel strips 11 and 12, each folded along a line 13 to form one big and one small rod surface. The two sheet-steel strips 11 and 12 and also the sheet-steel strip forming the partition wall are welded together along their upper and lower edges 14 and 14'.

The stirring wings 7 comprise a central portion 19 ending with its two opposite ends in sections 20 and 21 folded off in opposite directions. The stirring wing 7 is mounted to the smaller wall 12 of the arm 6, which is the front wall in FIG. 1. The inclined upper portion 20 points rearwardly in FIG. 1, while the inclined portion 21 points forwardly in FIG. 1. The mounting of the smaller wing 8 to the arm 6 is realized in the same manner. The arm 16 has mounted to it the stirring wings 7 and 8 in the same manner as described for the arm 6. The arms 6, 16 and 18 are mounted on the shaft 4 so that the shorter sides of the cross-section are turned upwards, while the arms 15 and 17 are arranged so that the longer sides of their cross-sections are turned upwards. The arm 15 carries a stirring wing 22 which is mounted in a manner such that its central portion 23 rests on the forward, upwardly pointing longer face 24, as viewed in FIG. 1. The upper inclined portion 25 of this stirring wing 22 points to the rear, while the lower inclined portion 26 of the stirring wing points to the front. In FIG. 1, the shaft 4 is driven in clockwise direction, as viewed from above. The stirring wings 7 and 22 move in this case through the material in the tank in the direction indicated by arrow 27 in FIGS. 4 and 5, so that the stirring wing 22 transports the material in the tank upwardly, while the stirring wing 7 moves it downwardly. The length of the stirring wings has been selected to ensure that the annular area in which the stirring wing 22 rotates overlaps radially one half of the area in which the stirring wing 7 rotates. The other half of the tank area worked by the stirring wing 22 is once more worked by the upper portion of the stirring wing 28 mounted on the rod 16 in the same manner in which the stirring wing 7 is mounted on the rod 6. Stirring wings corresponding to the smaller stirring wing 8 on the arm 6 are mounted also in the same manner as the stirring wings 22 and 28 on the rods 15, 16, 17 and 18; the rod 18 carries on its end portion also a larger stirring wing corresponding to the wing 28. Due to the overlapping working areas of the stirring wings 22, 7 and 28, the material in the tank is successively moved downwardly by the stirring wing 7, then upwardly by the stirring wing 22, downwardly by the stirring wing 28 and again upwardly by the stirring wing mounted on the arm 17. Between the phases in which one specific partial volume is treated by the individual stirring wings certain intervals are encountered because the shaft 4 rotates at a relatively low speed, namely approx. 0.5 to 30 revolutions per minute, with an agitator diameter of approx. 1.30 m and a tank diameter of approx. 1.35 m. The width of the stirring blade is approx. 25 cm, the overall length approx. 60 cm. These dimensional relationships are intended to give a general impression only, and different dimensions may be selected for other tanks. The individual components of the tank are for instance made from stainless steel, wherever possible.

In the example shown in the drawing, the end portions 20, 21, 25, 26, 50 and 51 of the stirring wings are inclined at a slight angle relative to a horizontal line, but at equal or else opposite angles relative to the inclination of the central portion 19 or 23. A slight opposite inclination may be obtained when certain mounting methods for the stirring wing are used, but will not impair the cutting effect of the end portion. The arms 6, 15 to 18 are mounted to the shaft 4 in a position slightly turned around their longitudinal axes so that these arms will also support the mixing effect of the stirring wings carried by them. So, the sheet-steel strip 38 provided in the plane of symmetry of these arms is slightly inclined relative to a vertical plane, as can be seen also in FIGS. 2 to 5.

In other embodiments of the invention, the arrangement of the rods may be such that one and the same tank may contain rods projecting outwardly and upwardly from the axis and others projecting outwardly and downwardly.

The tank may have a circular or cubical shape, different containers may also have different bottoms, for instance a dished or flat bottom or a bottom with an excentrical cone. The material of the tank and the agitator components may be steel, stainless steel or a plastic material. The agitator shaft may also not coincide with the tank axis.

By giving the stirring wings a suitable shape and arrangement, a certain wave motion can be obtained in addition to the shaking motion to support the uniform mixing of the tank content still further.

The tank of the invention is particularly suited for treating red grape mash during the fermentation process and for treating de-juiced white grape mash so as to keep it sufficiently liquid to permit draining from the tank after de-juicing.

FIGS. 6 and 7 show other stirring wings and arms in views similar to FIGS. 4 and 5. In the arrangement shown in FIG. 6, a wing 33 of S-shaped cross-section is mounted to a rectangular support 34. The end portions 50, 51 of the wing 33 exhibit different curvatures. As in the other figures, the direction of movement of the wing 33 is indicated by an arrow 27. FIG. 7 likewise shows a substantially S-shaped stirring wing 35 mounted on a rectangular support 36. The trailing edge 37 of this wing is cupped upwardly so that this wing creates greater turbulence.

The cylindrical portion 3 of the tank shown in the example has a height of approx. 2 m, the arms have a length of approx. 210 cm. The overall height of the tank, including the cone-shaped bottom which is partly broken away in the drawing, is approx. 430 cm.

During the fermentation process, the grapes mount to the surface and form a rigid grape-cake. So, stirring alone would have no success as the mash would substantially rotate with the agitator. However, due to the particular design of the wings described by this invention, certain portions of the grape-cake are cut off and lifted, while the oppositely inclined wing of the invention also cuts off a piece of the grape-cake and pushes it downwardly into the juice. This alternate lifting and lowering of the rapes helps to extract the pigment from the grape skins. So, a very gentle movement of the grape mash is achieved, combined with a high rinsing and mixing effect which gives the wine an excellent colour but keeps the tannin extraction of the fermenting mash at a low level.

The rotational speed of the agitator is between 0.5 and 6 revolutions per minute. The agitator may be alternately driven in the two directions, and stops may be provided between the movements in the different senses. The quantity of turbid matters is also very low when this agitating method is used. Stops of the agitator are also advantageous in so far as they will extremely reduce the tendency of the mash to rotate together with the agitator, and that in particular if the sense of rotation is changed after the stop, or else instead of the stop. But the more the tendency of the mash to rotate with the agitator is reduced by the stirring method, the better will be the chance to do without the troublesome holder-ups in the tank which in addition to obstructing the movement of the rapes in the vertical direction are also found to render cleaning of the tank more troublesome.

The stirring wings of the invention are also suited for the mixing of mashes prepared for the production of technical alcohol.

What I claim is:

1. An agitator for red grape mash comprising in combination:
   a vertical rotary shaft with
   rods projecting outwardly therefrom for reception in red grape mash having grape cake therein;
   stirring wings carried by said rods;
   each of said wings having at least one first central section inclined at an angle relative to the sense of rotation for transporting the grape mash and for cutting pieces of the grape cake in an upward or downward direction according to the direction of inclination and the sense of rotation;
   each of said wings having also at least one second end section connecting with one end of said first central section to cut the grape cake at the surface of the mash into pieces,
   said second section being inclined in the same direction as said first section but at an angle smaller than the angle of inclination of said first section;
   and means for slowly rotating said shaft in one direction,
   stopping said shaft,
   and rotating said shaft in the opposite direction;
   two groups of said rods and stirring wings being provided;
   said stirring wings of said two groups being oppositely inclined such that during rotation a first group of said stirring wings conveys the grape mash in one axial direction;
   while the stirring wings of the second group convey the grape mash in the opposite axial direction, the rods and stirring wings of the two groups being staggered relative to each other in the direction of rotation of the agitator shaft.

2. An agitator in accordance with claim 1, in which the rods and stirring wings of the two groups are staggered relative to each other by substantially 180°.

3. An agitator for red grape mash comprising in combination:

a vertical rotary shaft with rods projecting outwardly therefrom for reception in red grape mash having grape cake therein;

stirring wings carried by said rods;

each of said wings having at least one first central section inclined at an angle relative to the sense of rotation for transporting the grape mash and for cutting pieces of the grape cake in an upward or downward direction according to the direction of inclination and the sense of rotation;

each of said wings having also at least one second end section connecting with one end of said first central section to cut the grape cake at the surface of the mash into pieces, said second section being inclined in the same direction as said first section but at an angle smaller than the angle of inclination of said first section;

and means for slowly rotating said shaft in one direction, stopping said shaft, and rotating said shaft in the opposite direction;

two groups of said rods and stirring wings being provided;

said stirring wings of said two groups being oppositely inclined such that during rotation a first group of said stirring wings conveys the grape mash in one axial direction;

while the stirring wings of the second group convey the grape mash in the opposite axial direction, said rods and stirring wings being positioned such that two of said stirring wings of the two different groups succeed each other in the sense of rotation and act upon the same volume portion in the grape mash.

4. An agitator for red grape mash comprising in combination:

a vertical rotary shaft with rods projecting outwardly therefrom for reception in red grape mash having grape cake therein;

stirring wings carried by said rods;

each of said wings having at least one first central section inclined at an angle relative to the sense of rotation for transporting the grape mash and for cutting pieces of the grape cake in an upward or downward direction according to the direction of inclination and the sense of rotation;

each of said wings having also at least one second end section connecting with one end of said first central section to cut the grape cake at the surface of the mash into pieces, said second section being inclined in the same direction as said first section but at an angle smaller than the angle of inclination of said first section;

and means for slowly rotating said shaft in one direction, stopping said shaft, and rotating said shaft in the opposite direction;

two groups of said rods and stirring wings being provided;

said stirring wings of said two groups being oppositely inclined such that during rotation a first group of said stirring wings conveys the grape mash in one axial direction;

while the stirring wings of the second group convey the grape mash in the opposite axial direction, said rods and stirring wings of said two different groups being staggered relative to each other along the direction of the axis of the shaft;

the staggered stirring wings of the two different groups being positioned such as to act upon volume portions of the grape mash which overlap.

5. An agitator for red grape mash comprising in combination:

a vertical rotary shaft with rods projecting outwardly therefrom for reception in red grape mash having grape cake therein;

stirring wings carried by said rods;

each of said wings having at least one first central section inclined at an angle relative to the sense of rotation for transporting the grape mash and for cutting pieces of the grape cake in an upward or downward direction according to the direction of inclination and the sense of rotation;

each of said wings having also at least one second end section connecting with one end of said first central section to cut the grape cake at the surface of the mash into pieces, said second section being inclined in the same direction at said first section but at an angle smaller than the angle of inclination of said first section;

and means for slowly rotating said shaft in one direction, stopping said shaft, and rotating said shaft in the opposite direction;

the rods being mounted on said shaft at an acute angle relative to the axis of said shaft.

6. An agitator in accordance with claim 5, in which said rods extend outwardly and upwardly from said shaft at said acute angle relative to the axis of said shaft.

* * * * *